US012731182B2

(12) United States Patent
Sejpal et al.

(10) Patent No.: US 12,731,182 B2
(45) Date of Patent: Sep. 8, 2026

(54) PARSING TEXT CONTENT TO GENERATE LINKS TO DATABASE OF ITEMS USING LARGE LANGUAGE MODELS

(71) Applicant: Maplebear Inc., San Francisco, CA (US)

(72) Inventors: Riddhima Sejpal, Dublin, CA (US); Jatin Jain, Issaquah, WA (US); Prithvishankar Srinivasan, Seattle, WA (US)

(73) Assignee: Maplebear Inc., San Francisco, CA (US)

(*) Notice: Subject to any disclaimer, the term of this patent is extended or adjusted under 35 U.S.C. 154(b) by 41 days.

(21) Appl. No.: 18/821,722

(22) Filed: Aug. 30, 2024

(65) Prior Publication Data

US 2026/0065347 A1 Mar. 5, 2026

(51) Int. Cl.
*G06Q 30/0601* (2023.01)

(52) U.S. Cl.
CPC ..... *G06Q 30/0631* (2013.01); *G06Q 30/0603* (2013.01); *G06Q 30/0627* (2013.01); *G06Q 30/0635* (2013.01)

(58) Field of Classification Search
CPC .......... G06Q 30/0601–06444; G06F 40/10–35
See application file for complete search history.

(56) References Cited

U.S. PATENT DOCUMENTS 11,880,393 B1 * 1/2024 Neumann ............ G06N 3/0475
12,488,197 B1 * 12/2025 Garcia ................. G06Q 30/015
2013/0149675 A1 * 6/2013 Slone .................... A47J 36/321 434/127
2015/0220624 A1 * 8/2015 Bhatt .................... G06F 16/951 707/722
2021/0241342 A1 * 8/2021 Naidu ............... G06F 16/24522
2021/0241354 A1 * 8/2021 Mukherjee .............. G06F 3/167
2022/0292568 A1 * 9/2022 Faurot, III ........ G06F 16/24578
2023/0046227 A1 * 2/2023 Yamada ................ G06F 40/295
2025/0225569 A1 * 7/2025 Lapierre .......... G06V 30/19007

OTHER PUBLICATIONS

Ingredient Extraction from Text in the Recipe Domain. Arkin Dharawat, Chris Doan. Apr. 18, 2022. https://doi.org/10.48550/arXiv.2204.08137 (Year: 2022).*

* cited by examiner

*Primary Examiner* — William J Allen
(74) *Attorney, Agent, or Firm* — Fenwick & West LLP

(57) ABSTRACT

Item linked recipe generation using machine learning is described. Raw data is received that describes a recipe that uses ingredients. Ingredient descriptors are extracted from the raw data for the ingredients. Parsed ingredient data is determined using the ingredient descriptors and a large language model, such that the parsed ingredient data for each ingredient includes a name, a quantity, and a unit of measure. The name of each ingredient is mapped to a corresponding ingredient identifier that is part of an ingredient database. And each ingredient identifier in the ingredient database is associated with a corresponding item that is available for sale at one or more sources. A linked recipe is generated that includes for each ingredient: an ingredient identifier, a quantity of the ingredient, and a unit of measure of the quantity. A recommendation for the linked recipe is provided to a user client device.

18 Claims, 6 Drawing Sheets

PARSING TEXT CONTENT TO GENERATE LINKS TO DATABASE OF ITEMS USING LARGE LANGUAGE MODELS

BACKGROUND

Some online platforms may present online recipes for their users. Conventionally, online recipes are often manually added to the online platforms by its users or employees. This can be extremely labor intensive, especially for large numbers of recipes. Moreover, recipes presented on such online platforms generally use generic terminology (e.g., "milk") to describe recipe ingredients using unstructured text content. As such, the ingredients are not linked to specific products that can be acquired from one or more sources (e.g., a specific grocery store preferred by a user). Because of this lack of mapping between unstructured text describing ingredients and actual items in an online database, it is impossible to represent a typical online recipe in terms of a set of items available from an online database This makes obtaining the items by a user more cumbersome.

SUMMARY

In accordance with one or more aspects of the disclosure, natural language processing and machine learning technologies are employed to solve this problem by linking unstructured text content that contains a recipe to a set of items (e.g., ingredients) in an online database. More specifically, the process maps ingredients described in the unstructured text content to structured data that identifies one or more items stored in a computer database. This linking enables an improved computer user interface for an online system, which provides a user interface that enables a user more easily to search for and add items to a cart according to the recipe.

In one or more embodiments, an online system receives recipes that are described by raw recipe data, which may include images or unstructured text content. The online system may extract from the raw recipe data ingredient descriptors for ingredients of the recipes. In one or more embodiments, the online system uses one or more machine-learning models, such as large language models, to extract the ingredient descriptors. In one or more embodiments, some or all of the one or more machine-learning models may be part of an AI system. The online system may determine parsed ingredient data using the ingredient descriptors and the one or more large language models. The parsed ingredient data, for some or all of the ingredients, includes a name of the ingredient (e.g., salt), a unit of measure (e.g., "0.25 teaspoon"), and quantity (e.g., "1") of the unit of measure. In one or more embodiments, the one or more machine-learning models that are used for determination of the ingredient descriptors and for determination of the parsed ingredient are the same machine-learning models. In one or more embodiments, the online system may use the one or more machine learning models to directly generate parsed ingredient data from the raw recipe data.

The online system may map, for each ingredient of the parsed ingredient data, the name of the ingredient to a corresponding ingredient identifier that is part of an ingredient database. The ingredient database maps various ingredient identifiers to corresponding ingredient names (e.g., various synonyms), and corresponding items in an online catalog. In this manner, each ingredient of a recipe can be mapped to a corresponding food item that is available for purchase at one or more sources (e.g., a grocery source).

The online system may generate linked recipes based in part on the parsed ingredient data and the ingredient identifiers. A linked recipe may include, e.g., steps of the recipe, ingredient identifiers for the ingredients of a recipe, units of measure for the ingredients, and quantities of the units of measure. The online system may determine which ingredients of a linked recipe are key ingredients using one or more machine-learning models (e.g., the one or more machine-learning models of the AI system). The online system may update a recipe database (e.g., maps food items to corresponding recipes that use the food items as key ingredients) with the linked recipe. One or more recommendations for linked recipes may be provided to a user client device for presentation.

In the above manner, the online system can ingest a large number (e.g., 1000s) of recipes and convert them to linked recipes whose ingredients are shoppable by users of the online system via one or more sources. The online system may leverage machine-learning models to convert the raw recipe data to linked recipes, and may train the machine-learning models. The training may be such that the machine-learning models can account for various issues (e.g., ambiguities) with recipe ingredients (e.g., ranges of ingredient quantities, presence of sub-recipes, non-quantifiable ingredient amounts, etc.) which could otherwise make it difficult to identify items (e.g., that are available for sale in an online catalog) that corresponding to those ingredients.

In some aspects, the techniques described herein relate to a method, performed at a computer system including a processor and a computer-readable medium, including: receiving raw recipe data that describes a recipe that uses a set of ingredients; extracting, from the raw recipe data, ingredient descriptors for the set of ingredients; determining parsed ingredient data using the ingredient descriptors and a machine-learning model, such that the parsed ingredient data for each ingredient of the set of ingredients includes a name of the ingredient, a quantity of the ingredient, and a unit of measure of the quantity; mapping, for each ingredient of the parsed ingredient data, the name of the ingredient to a corresponding ingredient identifier that is part of an ingredient database, and each ingredient identifier in the ingredient database is associated with a corresponding item that is available for sale at one or more sources; generating a linked recipe that includes, for each ingredient: an ingredient identifier, a quantity of the ingredient, and a unit of measure of the quantity; and providing a recommendation for the linked recipe to a user client device.

In some aspects, the techniques described herein relate to a computer program product including a non-transitory computer readable storage medium having instructions encoded thereon that, when executed by a processor of a computer system, cause the computer system to: receive raw recipe data that describes a recipe that uses a set of ingredients; extract, from the raw recipe data, ingredient descriptors for the set of ingredients; determine parsed ingredient data using the ingredient descriptors and a machine-learning model, such that the parsed ingredient data for each ingredient of the set of ingredients includes a name of the ingredient, a quantity of the ingredient, and a unit of measure of the quantity; map, for each ingredient of the parsed ingredient data, the name of the ingredient to a corresponding ingredient identifier that is part of an ingredient database, and each ingredient identifier in the ingredient database is associated with a corresponding item that is available for sale at one or more sources; generate a linked recipe that includes, for each ingredient: an ingredient identifier, a quantity of the ingredient, and a unit of measure of the quantity; and provide a recommendation for the linked recipe to a user client device.

In some aspects, the techniques described herein relate to a computer system including: a processor; and a non-transitory computer readable storage medium having instructions encoded thereon that, when executed by the processor, cause the computer system to: receive raw recipe data that describes a recipe that uses a set of ingredients, extract, from the raw recipe data, ingredient descriptors for the set of ingredients, determine parsed ingredient data using the ingredient descriptors and a machine-learning model, such that the parsed ingredient data for each ingredient of the set of ingredients includes a name of the ingredient, a quantity of the ingredient, and a unit of measure of the quantity, map, for each ingredient of the parsed ingredient data, the name of the ingredient to a corresponding ingredient identifier that is part of an ingredient database, and each ingredient identifier in the ingredient database is associated with a corresponding item that is available for sale at one or more sources, generate a linked recipe that includes, for each ingredient: an ingredient identifier, a quantity of the ingredient, and a unit of measure of the quantity, and provide a recommendation for the linked recipe to a user client device.

DETAILED DESCRIPTION

Figure 1:
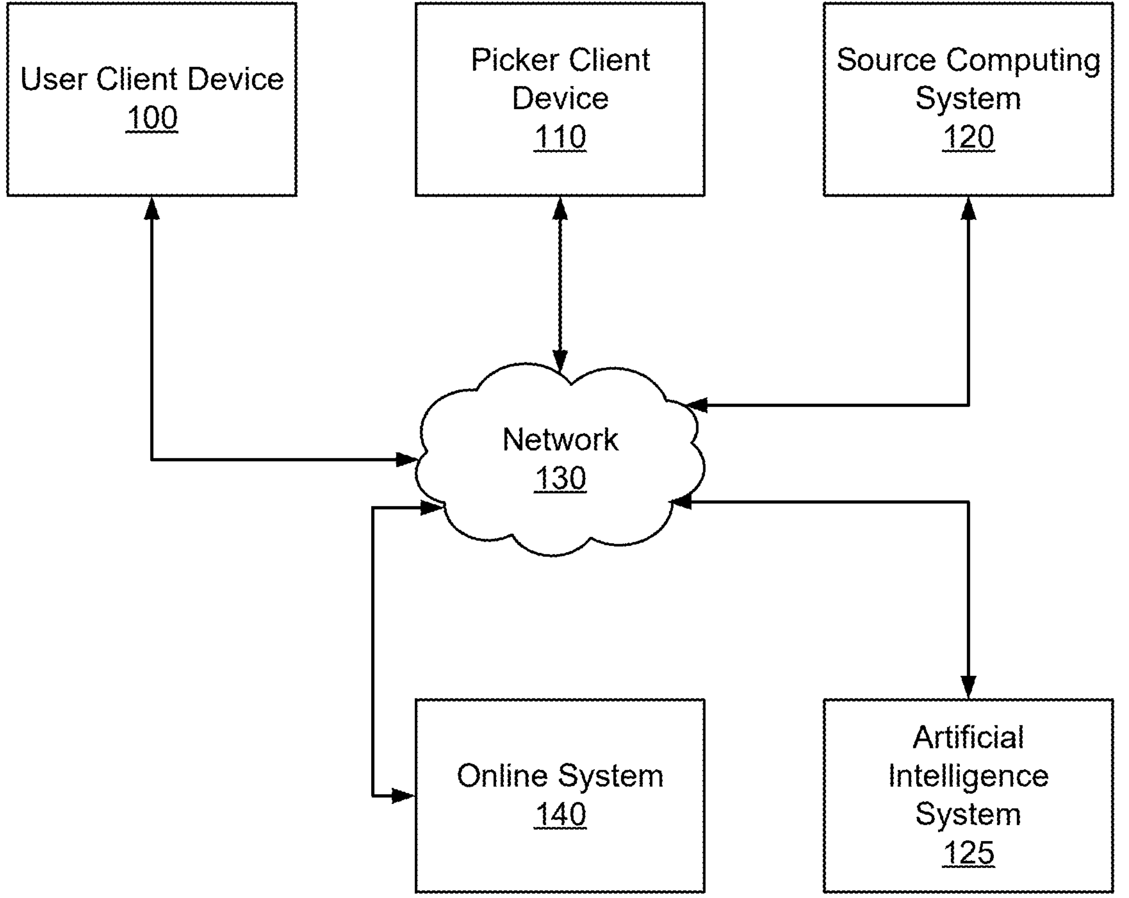
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, an artificial intelligence (AI) system 125, a network 130, and an online system 140. Alternative embodiments may include more, fewer, or different components from those illustrated in FIG. 1, and the functionality of each component may be divided between the components differently from the description below. For example, some or all of the functionality of the AI system 125 may be performed by the online system 140. Additionally, each component may perform their respective functionalities in response to a request from a human, or automatically without human intervention.

Although one user client device 100, picker client device 110, source computing system 120, and AI system 125 are illustrated in FIG. 1, any number of users, pickers, sources, and AI systems may interact with the online system 140. As such, there may be more than one user client device 100, picker client device 110, source computing system 120, or AI system 125.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

A "food item" is an item that is a nourishing substance that may be eaten or drunk. Recipes are a set of directions for preparing one or more ingredients to obtain a preparation of a nourishing substance. A recipe has a full list of ingredients, and the full list of ingredients includes at least one key ingredient. A key ingredient of a recipe is a main ingredient that has significant influence in, e.g., the flavor, texture, taste, aroma, appeal, etc., of the preparation. For example, potatoes are a key ingredient for potato salad, but parsley, while an ingredient, is not a key ingredient. Depending on the recipe there may be multiple key ingredients for the recipe. Moreover, being a key ingredient is highly dependent on the type of recipe. For example, potatoes may not be a key ingredient for pot roast, but would be a key ingredient for potato salad.

Raw recipe data may be used to describe one or more recipes that have not been fully processed by the online system 140 to have corresponding linked recipes. A linked recipe is a recipe which includes, for some or all of the ingredients of the recipe, corresponding items that are available for sale via one or more sources. For example, the user client device 100 may be used to gather raw recipe data from a third party website. The gathered raw recipe data may be, e.g., a text description of the generic descriptions of ingredients (e.g., milk) and steps of the recipe. The user client device 100 may provide the raw recipe data to the online system 140 for processing to form a linked recipe that identifies specific items that are for sale at one or more sources and correspond to the generic ingredients. Moreover, the corresponding items identified by the linked recipe may be sized according to the quantity specified in the recipe. For example, if a recipe calls for a tablespoon of palm sugar, a corresponding item (e.g., Maui Bob's Organic Palm Sugar) for palm sugar may be a smaller amount (e.g., 100 g bag available for sale instead of 1 kg bag that may also be available).

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected. The ordering interface may include a recipe carousel or some other section for presenting linked recipes. The recipe carousel includes one or more linked recipes provided by the online system 140. Responsive to selection of a linked recipe, the user client device 100 may present, e.g., steps of the linked recipe, and items corresponding to ingredients of the linked recipe. Some examples of the ordering interface are shown and described below with regard to FIGS. 4A-B.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface). In some embodiments, the user client device 100 may also be used to provide complaint data to the online system 140. For example, a linked recipe by the user may not correctly identify a particular ingredient in some manner. The user client device 100 may generate complaint data based on, e.g., user input regarding issues with the linked recipe, and provide the complaint data to the online system 140.

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The AI system 125 may be configured to apply inputs (e.g., prompts) to one or more machine-learning models to generate responses to the prompts. The AI system 125 includes one or more machine-learning models. The one or more machine-learning models may be generative machine-learning models.

The AI system 125 may sanitize raw recipe data to obtain ingredient descriptors. The ingredient descriptors are text strings that can be further parsed to identify specific features of the ingredients (e.g., name, unit of measure, quantity). The AI system 125 may receive (e.g., from the online system 140) inputs including raw recipe data. The AI system 125 may sanitize the raw recipe data by applying the raw recipe data to one or more machine-learning models that extract ingredient descriptors from the raw recipe data. As such the one more machine-learning models may be trained to take text or images of text that describe recipes, and output text strings associated with the recipe steps and the ingredients. The AI system 125 may provide the ingredient descriptors to the online system 140.

Note that some recipes have somewhat ambiguous descriptions of ingredients which make it difficult for conventional machine-learning models to parse. For example, a compound ingredient is an example of ambiguous presentation of ingredients in the raw recipe data. A compound ingredient occurs where a recipe is presented in a manner such that where a single ingredient would normally be presented, there are actually multiple ingredients (e.g., "1 tsp of salt and pepper"). The one or more machine-learning models (e.g., of the AI system 125) may be trained to identify compound ingredients in the raw recipe data such that an ingredient descriptor is output for each of the ingredients that make up the compound ingredient (e.g., one covering 1 tsp of salt and another for 1 tsp of pepper). Note that the one or more machine-learning models may also be trained to identify products that present as compound ingredients but are actually a single ingredient. For example, the raw recipe data may call for "chocolate milk," and the one or more machine-learning models would output an ingredient descriptor for "chocolate milk" and not break it out into individual components and generate item descriptions for the individual components.

Inclusion of a sub-recipe in the raw recipe data is another example of how ingredients may be ambiguously presented in the raw recipe data. A sub-recipe is a subset of the recipe that is used to make some component of the recipe. For example, to make a pie, there often is a recipe for a filling, and a sub-recipe regarding how to make the crust. Similarly, to make a cake, there often is a recipe for a sponge of the cake and a sub-recipe for making the frosting. The one or more machine-learning models may be trained to identify sub-recipes within the raw recipe data such that given raw recipe data that includes a sub-recipe, the one or more machine-learning models would output ingredient descriptors for each of the ingredients used in the sub-recipe.

The AI system 125 may determine parsed ingredient data using the extracted ingredient descriptors. For example, the AI system 125 may apply a prompt (e.g., received from the online system 140) along with the parsed ingredient data to one or more machine-learning models that is configured to output parsed ingredient data. Parsed ingredient data describes, for a given ingredient descriptor: a name of the ingredient, a unit of measure, and a quantity of the unit of measure for the ingredient. In this manner, the one or more machine-learning models can break down each ingredient into a quantifiable form (e.g., name=sugar, unit of measure=grams, quantity of the unit of measure=10). The AI system provides the parsed ingredient data to the online system 140.

Note that in some instances ingredient descriptors may include information that is not readily quantifiable in amount or ingredient type. For example, an ingredient descriptor may include a range of values, multiple options for a single ingredient, ingredients that do not include a specific quantity, etc. The one or more machine-learning models may be trained to handle these instances such that the parsed ingredient data for an ingredient quantifies both ingredient type and amount. For example, given a range of values (e.g., "8-10 cloves of garlic"), the one or more machine-learning models may be trained to select a highest value of the range (e.g., 10 cloves). Likewise, given multiple options that may be used for a single ingredient (e.g., "chicken or beef broth"), the one or more machine-learning models may be trained to select a single ingredient (e.g., chicken broth). The training may be, e.g., to select an ingredient listed first. In embodiments, where there is no specific quantity (e.g., "salt to taste," "pinch of thyme," "dash of celery salt," etc.) for an ingredient descriptor, the one or more machine-learning models may be trained such that the parsed ingredient data has a quantity value of 1 and a unit value of "each."

In some embodiments, in generating the parsed ingredient data, the one or more machine-learning models may also further process the parsed ingredient data in a manner that facilitates mapping the data to items of an online catalog. For example, the one or more machine-learning models may be trained to remove brands from ingredient names in the parsed ingredient data. In some embodiments, the one or more machine-learning models may be trained to replace quantities that are described as fractions with their corresponding floating point values (e.g., ¾ cup becomes 0.75 cup).

In some embodiments, the AI system 125 may be used to identify key ingredients of recipes. For example, the AI system 125 may receive inputs from the online system 140 to identify key ingredients for various recipes. The inputs may be, e.g., one or more prompts, the raw recipe data, the ingredient descriptors, the parsed ingredient data, or some combination thereof. The AI system 125 may apply the inputs to one or more machine-learning models to determine, for some or all of the various recipes, corresponding key ingredients. The AI system 125 may provide a listing of the key ingredients for each of the various recipes to the online system 140.

In one or more embodiments, at least some of the one or more machine-learning models are large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the AI system 125. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

The user client device 100, the picker client device 110, the source computing system 120, the AI system 125, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The online system 140 maintains an online catalog of items that are available for sale at various sources, including the grocery store source. The user client device 100 may present items from the online catalog that are associated with the grocery store source. The user may select, via the user client device 100, items from the online catalog. The user's order may specify which groceries they want to be delivered from the grocery store and the quantities of each of the groceries. The user client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140.

The online system 140 may receive raw recipe data that is associated with sets of ingredients for each recipe described by the raw recipe data. Raw recipe data may be received from, e.g., the user client device, the source computing system 120, a third party website (not shown), an agent of the online system 140, or some combination thereof.

The online system 140 extracts, from the raw recipe data, ingredient descriptors for the sets of ingredients. In some embodiments, the online system 140 uses one or more machine-learning models to extract the ingredient descriptors. For example, the online system 140 may generate and provide a prompt to the AI system 125 to apply to the one or more machine-learning models with the raw recipe data to extract the ingredient descriptors.

The online system 140 may determine parsed ingredient data using the ingredient descriptors and one or more machine-learning models (e.g., the one or more machine-learning models of the AI system 125). For example, the online system 140 may generate and provide a prompt to the AI system 125 to apply to the one or more machine-learning models with the raw ingredient descriptors to determine the parsed ingredient data. In this manner, the parsed ingredient data, for each ingredient includes a name of the ingredient (e.g., salt), a unit of measure (e.g., "0.25 teaspoon"), and quantity (e.g., "1") of the unit of measure. In some embodiments, the one or more machine-learning models that are used for determination of the ingredient descriptors are also used for determination of the parsed ingredient data.

The online system 140 may map, for each ingredient of the parsed ingredient data, the name of the ingredient to a corresponding ingredient identifier that is part of an ingredient database. The ingredient database maps various ingredient identifiers to corresponding ingredient names (e.g., including synonyms), and corresponding items in an online catalog. In this manner, each ingredient of a recipe can be mapped to a corresponding food item that is available for purchase at one or more sources (e.g., a grocery source preferred by the user).

The online system 140 generates linked recipes using the parsed ingredient data and the ingredient identifiers. A linked recipe includes, e.g., steps of the recipe, ingredient identifiers for the ingredients of a recipe, units of measure for the ingredients, and quantities of the units of measure. The online system 140 may determine which ingredients of a linked recipe are key ingredients using a machine-learning model (e.g., the one or more machine-learning models of the AI system 125). The online system 140 may update a recipe database (e.g., maps food items to corresponding recipes that use the food items as key ingredients) with the linked recipe.

One or more recommendations for linked recipes are provided to the user client device 100 for presentation. For example, in some embodiments, an ordering list associated with the user may include one or more food items. The online system 140 may query the recipe database based in part on the one or more food items to obtain one or more linked recipes that use some or all of the one or more food items. The online system 140 may rank the one or more linked recipes based on one or more ranking criteria (e.g., a recipe based on a number of key ingredients of the recipe that are present in the ordering list). The online system 140 may provide recommendations for the one or more ranked recipes to the user client device 100 (e.g., for presentation in the recipe carousel). The online system 140 is described in further detail below with regards to FIG. 2.

Figure 2:
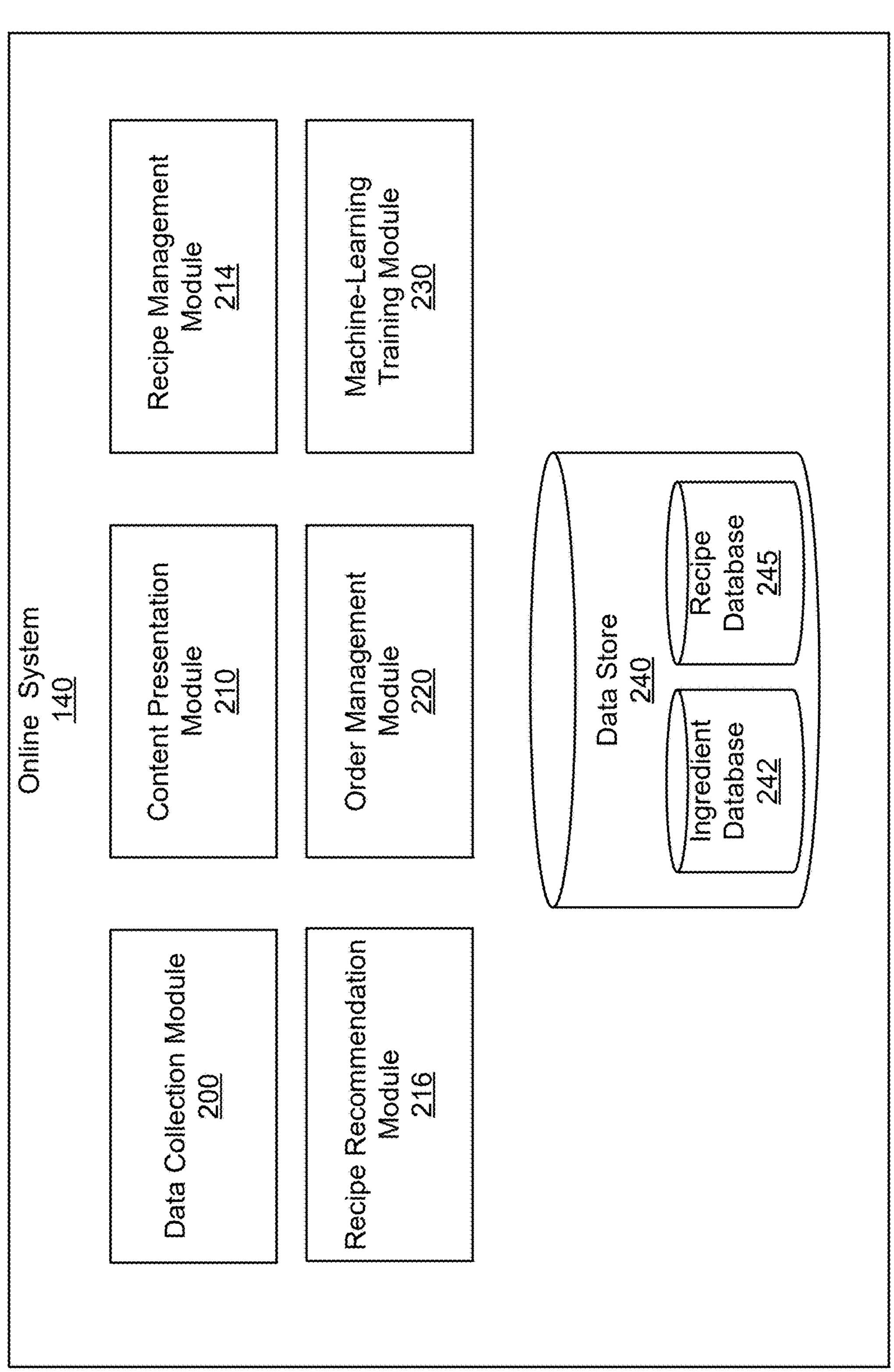
FIG. 2 illustrates an example system architecture for an online system, in accordance with some embodiments.

FIG. 2 illustrates an example system architecture for an online system 140, in accordance with some embodiments. The system architecture illustrated in FIG. 2 includes a data collection module 200, a content presentation module 210, a recipe management module 214, a recipe recommendation module 216, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140. The data collection module 200 may also collect complaint data from user client devices associated users. The complaint data describes, e.g., user complaints (e.g., improper ingredient) regarding linked recipes.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The recipe management module 214 extracts, from raw recipe data that describes one or more recipes, ingredient descriptors for sets of ingredients used by one or more recipes. Raw recipe data may be received from, e.g., the user client device 100, the source computing system 120, a third party website, an agent of the online system 140, or some combination thereof. In some embodiments, the recipe management module 214 uses a machine-learning model to extract the ingredient descriptors. The recipe management module 214 generates one or more prompts to provide to the AI system 125. In some embodiments, generation of a prompt includes updating a previously generated prompt with new information.

The one or more prompts may be configured to instruct the one or more machine-learning models (e.g., of the AI system 125) to extract ingredient descriptors for ingredients used by the one or more recipes described by the raw recipe data. In some embodiments, the prompt may also instruct the one or more machine-learning models to identify whether any ingredients are compound ingredients that are composed of multiple ingredients, and to separate any identified compound ingredient into separate ingredients which in addition to the non-compound ingredients ingredient descriptors are extracted from. In some embodiments, the prompt may also instruct the one or more machine-learning models to identify whether the raw recipe data includes a sub-recipe, to identify any ingredients that are associated with the sub-recipe, and to extract ingredient descriptors for the identified ingredients in addition to ingredients that are not part of the sub-recipe.

The recipe management module 214 is configured to determine parsed ingredient data using the ingredient descriptors and one or more machine-learning models. For example, the recipe management module 214 may generate one or more prompts for the one or more machine-learning models. In some embodiments, generation of a prompt includes updating a previously generated prompt with new information. The one or more prompts may be configured to instruct the one or more machine-learning models to determine parsed ingredient data for some or all of the ingredient descriptors. In this manner, the parsed ingredient data, for each ingredient includes a name of the ingredient (e.g., salt), a unit of measure (e.g., "0.25 teaspoon"), and quantity (e.g., "1") of the unit of measure.

In some embodiments, the one or more machine-learning models used for determination of the ingredient descriptors and for determination of the parsed ingredient data are the same one or more machine-learning models. And in some embodiments, the recipe management module 214 may generate a prompt that is configured to determine parsed ingredient data directly from the raw recipe data.

The recipe management module 214 is configured to map names of ingredients from the parsed ingredient data to corresponding ingredient identifiers of an ingredient database 242. The ingredient database 242 maps various ingredient identifiers to corresponding ingredient names (e.g., including synonyms), and corresponding items (e.g., food items) in an online catalog. In this manner, each ingredient name of the parsed ingredient data can be mapped to a corresponding item that is available for purchase at one or more sources. Note that in some embodiments, the parsed ingredient data may include ingredient names that are associated with non-food items (e.g., cheesecloth, silicon mat, etc.) that are used in the recipe. In some embodiments, the recipe management module 214 also maps ingredient names that are associated with non-food items to corresponding ingredient identifiers using the ingredient database 242.

The recipe management module 214 is configured to generate linked recipes using the parsed ingredient data and the ingredient identifiers. The recipe management module 214 may form a linked recipe using, e.g., the ingredient identifiers, the parsed ingredient data, and the raw recipe data (e.g., includes steps of the recipe, and other information like, e.g., preparation time, calories, images associated with the recipe, etc.). Note each ingredient of a linked recipe includes a corresponding ingredient identifier which may map to different items based on which source a user is shopping from. Responsive to selection of a linked recipe by a user of the user client device 100, the content presentation module 210 may, e.g., identify items corresponding to the ingredient identifiers using, e.g., the ingredient database 242, and provide the identified items to the user client device 100 for presentation.

The recipe management module 214 may determine which ingredients of a linked recipe are key ingredients. The recipe management module 214 generates one or more prompts to provide to the AI system 125. In some embodiments, generation of a prompt includes updating a previously generated prompt with new information. In some embodiments, the one or more prompts may be configured to instruct the one or more machine-learning models (e.g., of the AI system 125) to identify, for one or more recipes, key ingredients from a full list of ingredients of the one or more recipes. The recipe management module 214 may include with the prompt some additional inputs, specifically, e.g., raw recipe data that describes the one or more recipes, ingredient descriptors associated with the one or more recipes, parsed ingredient data associated with the one or more recipes, or some combination thereof. The prompt may, e.g., provide instruction that a key ingredient of a recipe is a main ingredient that has significant influence in, e.g., the flavor, texture, taste, aroma, appeal, etc., of the preparation. The prompt may allow for multiple key ingredients in a recipe. In some embodiments, the prompt may specify that any type of protein in a recipe is a key ingredient. The prompt may also, e.g., instruct the one or more machine-learning models to only return key ingredients. The recipe management module 214 may provide the one or more prompts along with the additional inputs (e.g., the raw recipe data, etc.) to the one or more machine-learning models to obtain at least one key ingredient for each of the plurality of recipes. For example, the plurality of recipes may include baked salmon whose full list of ingredients include salmon, lemon, and seasoning; and tomato bisque whose full list of ingredients includes tomatoes, cream, onions, and basil. The one or more machine-learning models may identify that salmon is a key ingredient for the baked salmon recipe, and tomatoes and cream are key ingredients for the tomato bisque recipe.

The recipe management module 214 receives from the one or more machine learning models (or the AI system 125) for each of the one or more recipes a respective set of one or more key ingredients. The recipe management module 214 may map the one or more linked recipes to their identified one or more key ingredients in a recipe database 245. In this manner, the recipe management module 214 can update the recipe database 245 with new mappings of key ingredients that are food items to corresponding recipes. The recipe management module 214 may, e.g., update the recipe database 245 periodically (e.g., hourly, daily, weekly, etc.) or in accordance with some other schedule.

The recipe recommendation module 216 may generate recipe recommendations for a user based in part on contents (e.g., food items) of an ordering list for that user. Responsive to an update (e.g., addition of a food item, subtraction of a food item) to the ordering list of the user, the recipe recommendation module 216 may generate a query for linked recipes using item data (e.g., SKU, item identifier, etc.) associated with items in the ordering list as parameters for the query. The recipe recommendation module 216 may provide the query to the recipe database 245 to obtain linked recipes that use at least one food item in the ordering list.

The recipe recommendation module 216 may rank the one or more linked recipes based on one or more ranking criteria. Ranking criteria is one or more criterion that are used to rank linked recipes. Ranking criteria may include, e.g., a number of key ingredients of the linked recipe that are present in the ordering list, availability of key ingredients of the linked recipe from a storefront for purchase that are not present in the ordering list, a total preparation time for a linked recipe, a percentage of a total number of key ingredients of the linked recipe that are present in the ordering list, popularity of the linked recipe, simplicity of a linked recipe, a number of times the user previously selected the linked recipe, some other criterion that may be used to rank a recipe, or some combination thereof.

For example, a ranking criterion may be availability of key ingredients of the linked recipe from the storefront for purchase that are not present in the ordering list. And the recipe recommendation module 216 may, for each linked recipe of the one or more linked recipes, determine for that linked recipe availability of any key ingredients from the storefront for purchase that are not present in the ordering list. Using this ranking criterion alone can result in linked recipes of the one or more linked recipes with key ingredients that are not in the ordering list but are available for purchase being ranked higher than linked recipes with key ingredients that are not available for purchase. In another example, a ranking criterion may be total preparation time. And the recipe recommendation module 216 may, for each linked recipe of the one or more linked recipes, determine respective total preparation times. The recipe recommendation module 216 may then rank the one or more linked recipes from shortest total preparation time to longest total preparation time. In embodiments, where there are multiple ranking criteria, the recipe recommendation module 216 may weight each of the ranking criteria, and then rank the one or more rankings based on the weighted rankings. In some embodiments, the weights are equal for different ranking criteria. In other embodiments, at least one ranking criterion is weighted differently from another ranking criterion. The recipe recommendation module 216 may provide recommendations for the one or more ranked linked recipes to the user client device 100. As shown in and described below with regard to, e.g., FIG. 4A, the user client device 100 may present the one or more recommendations in ranked order. For example, the user client device may present the one or more ranked recommendations for linked recipes on a recipe carousel. In some embodiments, the recipe carousel may be presented on a same page as the item area.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. Note in some embodiments, the AI system 125 and its machine learning-models are part of the online system 140 and the machine-learning training module 230 may train those machine-learning models. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include raw recipe data, item descriptions, parsed ingredient data, key ingredient data, user data, picker data, item data, complaint data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

For example, the machine-learning training module 230 may train a machine-learning model to extract ingredient descriptors from raw recipe data. The machine-learning training module 230 may access a set of training examples including training raw recipe data. The machine-learning training module 230 may apply the machine-learning model to the set of training examples to generate a training output corresponding to a set of ingredient descriptors. The machine-learning training module 230 may back-propagate one or more error terms obtained from one or more loss functions to update a set of parameters of the machine-learning model, and one or more of the error terms are based on a difference between a label applied to a test interaction of the set of training examples and the set ingredient descriptors.

Note that in some embodiments, the raw recipe data may include one or more sub-recipes. For example, the machine-learning training module 230 may train the machine-learning model to identify whether a recipe described by the raw recipe data includes a sub-recipe. The machine-learning training module 230 may train the machine-learning model to identify any ingredients that are associated with the sub-recipe, such that a set of ingredients includes ingredients for the recipe and ingredients for the sub-recipe. The machine-learning training module 230 may train the machine-learning model to extract, from the raw recipe data, ingredient descriptors for the set of ingredients in the manner described above.

Likewise in some embodiments, the raw recipe data may include one or compound ingredients. The machine-learning training module 230 may train the machine-learning model to identify whether any ingredient of a set of ingredients associated with a recipe described by the raw recipe data is a compound ingredient that is composed of multiple ingredients. The machine-learning training module 230 may train the machine-learning model to separate any identified compound ingredient into separate ingredients such that the set of ingredients includes the multiple ingredients. And the machine-learning training module 230 may train the machine-learning model to extract, from the raw recipe data, ingredient descriptors for the set of ingredients in the manner described above.

In another example, the machine-learning training module 230 may train a machine-learning model to determine parsed ingredient data from ingredient descriptors. The machine-learning training module 230 may access a set of training examples including ingredient descriptors. The machine-learning training module 230 may apply the machine-learning model to the set of training examples to generate a training output corresponding to parsed ingredient data. The machine-learning training module 230 may back-propagate one or more error terms obtained from one or more loss functions to update a set of parameters of the machine-learning model, and one or more of the error terms are based on a difference between a label applied to a test interaction of the set of training examples and the set parsed ingredient data.

In some embodiments, the ingredient descriptors in the training examples may include information that is not readily quantifiable in amount or ingredient type. For example, an ingredient descriptor may include a range of values, multiple options for a single ingredient, ingredients that do not include a specific quantity, etc. The machine-learning training module 230 may train the machine-learning model to handle these instances such that the parsed ingredient data for an ingredient quantifies both ingredient type and amount. For example, given a range of values (e.g., "8-10 cloves of garlic"), the machine-learning training module 230 may train the machine-learning model to select a highest value of the range (e.g., 10 cloves). Likewise, given multiple options that may be used for a single ingredient (e.g., "chicken or beef broth"), the machine-learning training module 230 may train the machine-learning model to select a single ingredient (e.g., chicken broth). And the machine-learning training module 230 may train the machine-learning model to generate parsed ingredient data that has a quantity value of 1 and a unit value of "each" for ingredient data that does not specify quantity (e.g., dash of, pinch of, etc.)

In some embodiments, the machine-learning training module 230 may train a machine-learning model to determine parsed ingredient data from raw recipe data (instead of from ingredient descriptors). The machine-learning training module 230 may access a set of training examples including raw recipe data. The machine-learning training module 230 may apply the machine-learning model to the set of training examples to generate a training output corresponding to parsed ingredient data. The machine-learning training module 230 may back-propagate one or more error terms obtained from one or more loss functions to update a set of parameters of the machine-learning model, and one or more of the error terms are based on a difference between a label applied to a test interaction of the set of training examples and the set parsed ingredient data.

In some embodiments, the machine-learning training module 230 may train the machine-learning model to remove brands from ingredient names in the parsed ingredient data. In some embodiments, the machine-learning training module 230 may train the machine-learning model to replace quantities that are described as fractions with their corresponding floating point values (e.g., ¾ cup becomes 0.75 cup).

In some embodiments, the machine-learning training module 230 may train the machine-learning model to identify key ingredients of recipes. The machine-learning training module 230 may be trained to identify the key ingredients of a recipe based on, e.g., raw recipe data describing the recipe, ingredient descriptors associated with the recipe, parsed ingredient data associated with the recipe, or some combination thereof. Note in some embodiments, a single machine-learning model may be trained by the machine-learning training module 230 to perform some or all of the above described tasks (e.g., extract ingredient descriptors, determine parsed ingredient data, determine key ingredients, etc.).

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein. In this manner, the machine-learning training module 230 may retrain one or more machine learning models to better, e.g., extract item descriptions from raw recipe data, determine parsed ingredient data from item descriptions, determine parsed ingredient data from raw recipe data, determine key ingredients, or some combination thereof. For example, the machine-learning training module 230 may determine additional training examples using portions of linked recipes and complaint data (e.g., reported complaints from users of the online system 140 regarding one or more of the linked recipes). The machine-learning training module 230 may retrain the machine-learning model based in part on the additional training examples.

The data store 240 stores data used by the online system 140. For example, the data store 240 stores the ingredient database 242, the recipe database 245, customer data, item data, complaint data, order data, and picker data for use by the online system 140. The data store 240 also stores trained machine learning models trained by the machine-learning training module 230. For example, the data store 240 may store the set of parameters for a trained machine learning model on one or more non-transitory, computer-readable media. The data store 240 uses computer-readable media to store data, and may use databases to organize the stored data.

The ingredient database 242 maps various ingredient identifiers to corresponding ingredient names, and corresponding items in an online catalog that are available for sale at various sources. The ingredient database 242, for a given ingredient, may include multiple versions of some or all of the ingredient names for that ingredient which are mapped to a single ingredient identifier for that ingredient, and that ingredient identifier is associated with one or more corresponding items that are available for sale via the online catalog at one or more sources. The versions may include, e.g., synonyms for an ingredient name (e.g., cilantro leaves, cilantro leaf, fresh cilantro, etc.) or abbreviations of an ingredient name, etc. Note, in some embodiments, an ingredient name may be for something that is not food, but is instead used to make the recipe (e.g., cheesecloth).

The recipe database 245 maps food items to corresponding linked recipes that use the food items as key ingredients. In some embodiments, item data associated with the food items are mapped to one or more linked recipes where the food items are key ingredients. Each linked recipe in the recipe database 245 includes a listing of ingredient identifiers for the recipe and instructions on how to use ingredients to prepare the meal. In some embodiments, a linked recipe may include, e.g., a name of the recipe, a total preparation time for the recipe, user reviews of the recipe, pictures of ingredient preparation at one or more steps in the recipe, an active time for the recipe, a number of services associated with the recipe, calories associated with the recipe, some other information relevant to the recipe, or some combination thereof.

Figure 3:
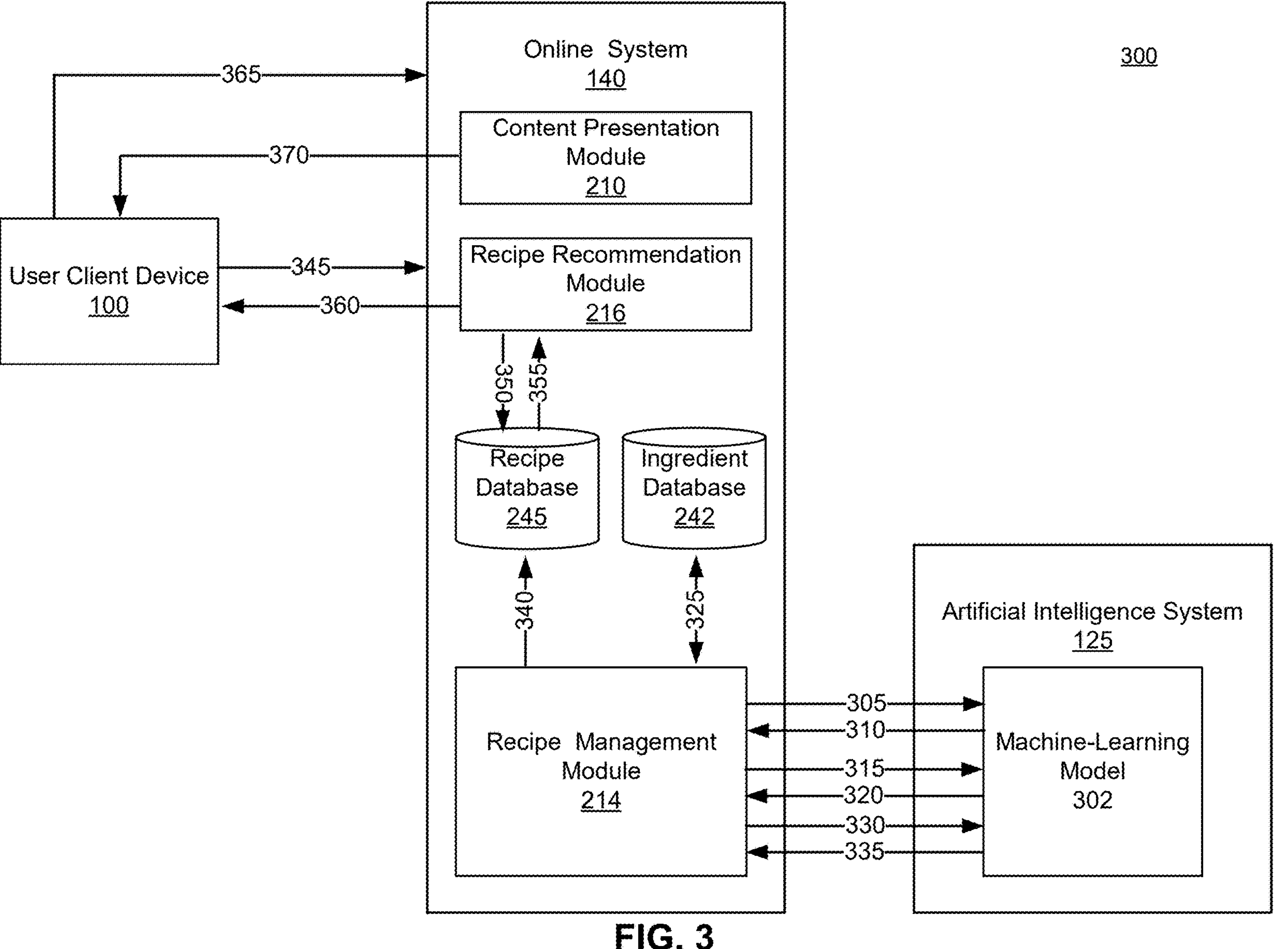
FIG. 3 is a diagram describing linked recipe generation and presentation, in accordance with one or more embodiments.

FIG. 3 is a diagram 300 describing linked recipe generation and presentation, in accordance with one or more embodiments. Alternative embodiments may include more, fewer, or different steps from those illustrated in FIG. 3, and the steps may be performed in a different order from that illustrated in FIG. 3. These steps may be performed using components of the system environment of FIG. 1. Additionally, each of these steps may be performed automatically by components of the system environment of FIG. 1 without human intervention. In some embodiments, the diagram 300 may be separated into two independent processes, a database update process and a recipe recommendation process.

The database update process occurs at steps 305, 310, 315, 320, 325, 330, 335, and 340, and describes an embodiment of how the recipe management module 214 manages what recipes are in the recipe database 245 and their associated mappings to various items.

The online system 140 receives recipes from one or more sources. For example, the online system 140 may receive recipes from, e.g., the user client device 100, the source computing system 120 (not shown), a third party website (not shown), an agent (not shown) of the online system 140, or some combination thereof. The recipe management module 214 may select a plurality of the received recipes. The plurality of recipes are described by raw recipe data which describes, for each recipe, a corresponding set of ingredients used in that recipe, and the steps to complete that recipe.

The recipe management module 214 may generate a prompt to provide to a machine-learning model 302 of the AI system 125. The prompt instructs the machine-learning model 302 to extract, from the raw recipe data, ingredient descriptors for each of the plurality of recipes. The recipe management module 214 provides 305 the prompt to the AI system 125. The AI system 125 applies the prompt to the machine-learning model 302 to extract the ingredient descriptors from the raw recipe data for each of the plurality of recipes. The AI system 125 provides 310 the ingredient descriptors for each of the recipes to the recipe management module 214.

The recipe management module 214 may generate a prompt to determine parsed ingredient data to provide to the machine-learning model 302 of the AI system 125. The prompt instructs the machine-learning model 302 to determine, from the ingredient descriptors, ingredient descriptors for each of the plurality of recipes. The recipe management module 214 provides 315 the prompt (and in some embodiments the ingredient descriptors) to the AI system 125. The AI system 125 applies the prompt to the machine-learning model 302 to determine the parsed ingredient data for each of the plurality of recipes. The AI system 125 provides 320 the ingredient descriptors for each of the recipes to the recipe management module 214. In this manner, the parsed ingredient data, for each ingredient includes a name of the ingredient (e.g., salt), a unit of measure (e.g., "0.25 teaspoon"), and quantity (e.g., "1") of the unit of measure.

The recipe management module 214 maps 325 names of ingredients from the parsed ingredient data to corresponding ingredient identifiers of the ingredient database 242. The ingredient database 242 maps various ingredient identifiers to corresponding ingredient names (e.g., including synonyms), and corresponding items (e.g., food items, and in some embodiments non-food items) in an online catalog. In this manner, each ingredient name of the parsed ingredient data is mapped to a corresponding item that is available for purchase at one or more sources.

The recipe management module 214 may generate linked recipes using at least the parsed ingredient data and the ingredient identifiers. For example, the recipe management module 214 may form a linked recipe from ingredient identifiers associated with the recipe, parsed ingredient data associated with the recipe, and steps of the recipe. Each ingredient of a linked recipe includes a corresponding ingredient identifier which may map to corresponding items that are available for sale via the online catalog at one or more sources.

Note each linked recipe also includes at least one key ingredient. To determine the key ingredients of the plurality of recipes the recipe management module 214 may generate a prompt. The prompt instructs the machine-learning model 302 to identify, for each of the plurality of recipes, at least one key ingredient of that recipe. The recipe management module 214 provides 330 the prompt to the AI system 125. The AI system 125 applies the prompt and, e.g., the raw recipe data, the ingredient descriptors, the parsed ingredient data, or some combination thereof, to a machine-learning model 302 to determine key ingredients for each of the plurality of recipes. The AI system 125 provides 335 the key ingredients for each of the recipes to the recipe management module 214.

The recipe management module 214 may map the one or more linked recipes to their identified one or more key ingredients in the recipe database 245. The recipe management module 214 updates 340 the recipe database 245 with new mappings of key ingredients to their corresponding linked recipes. The recipe management module 214 may, e.g., update the recipe database 245 periodically (e.g., hourly, daily, weekly, etc.) or in accordance with some other schedule.

Note in the illustrated embodiment, the AI system 125 and the machine-learning model 302 is shown as separate from the online system 140. In some embodiments, the machine-learning model 302 is part of the online system 140. And while the illustrated embodiment includes generation of separate prompts for extracting ingredient descriptors, parsing ingredient data, and determining key ingredients, in other embodiments, some or all of these actions may be performed using a single prompt that is provided to the machine-learning model 302.

The recipe recommendation process occurs at steps 345, 350, 355, 360, 365, and 370, and describes how the system environment of FIG. 1 generates recipe recommendations based on ordering list contents of a user of the user client device 100. The user client device 100 presents an ordering interface for a storefront that includes an item area listing a plurality of food items for sale. Responsive to a request from a user of the user client device 100, the user client device 100 may request 345 the online system 140 update an ordering list (e.g., add a food item to the ordering list) associated with the user. Responsive to the request, the online system 140 may update the ordering list.

The recipe recommendation module 216 queries 350 the recipe database 245 based in part on the food items in the ordering list to obtain one or more linked recipes that use at least some of the food items as key ingredients. For example, the recipe recommendation module 216 may identify all food items in the ordering list, and generate the query based on the identified food items. The recipe recommendation module 216 ranks the one or more linked recipes obtained 355 from the recipe database 245 based on one or more ranking criteria (e.g., based on a number of key ingredients of a recipe that are present in the ordering list). The recipe recommendation module 216 provides 360 recommendations for the one or more ranked linked recipes to the user client device 100. A recommendation for a linked recipe may be, e.g., a high level description of a recipe (e.g., a name of the recipe and an associated photo). The user client device 100 may present the one or more recommendations for the linked recipes in ranked order on a recipe carousel.

Responsive to selection of a description of a linked recipe on the user client device 100, the user client device 100 may request 365 additional details regarding the selected recommendation. The content presentation module 210 may use ingredient identifiers for ingredients of linked recipe and the source to identify items corresponding to the ingredients that are available for sale at the source. The content presentation module 210 may also extract additional information (e.g., from the raw recipe data) from the linked recipe like, e.g., steps to perform the recipe, images, preparation time, etc. The content presentation module 210 may provide 370 the identified items to the user client device 100. In some embodiments, the content presentation module 210 may also provide any of the retrieved additional information to the user client device 100. The user client device 100 presents a detailed recipe description that includes the identified items, and may also include some or all of the additional information.

In the above manner, the online system 140 can ingest a large number (e.g., 1000s) of recipes and convert them to linked recipes whose ingredients are shoppable by users of the online system via one or more sources. In the illustrated embodiment, the online system 140 uses the machine-learning model 302 to convert the raw recipe data to linked recipes. The machine-learning model may be trained to account for various issues (e.g., ambiguities) with recipe ingredients (e.g., ranges of ingredient quantities, presence of sub-recipes, non-quantifiable ingredient amounts, etc.) which could otherwise make it difficult to identify items (e.g., that are available for sale in an online catalog) that corresponding to those ingredients. Moreover, the online system 140 can recommend recipes based in part on food items currently in the ordering list. While conventional systems may recommend recipes based on, e.g., overall popularity of a recipe or user preferences. However, these approaches do not take into account food items that are in the ordering list of the user. Likewise, while conventional systems may utilize recipe databases to provide recipe suggestions and allow users to manually search for recipes based on specific ingredients or browse through categories of recipes, these approaches generally require manual input from the user which can be time-consuming and prone to errors. In contrast, the recipe recommendations are selected and provided by the online system 140.

Figure 4A:
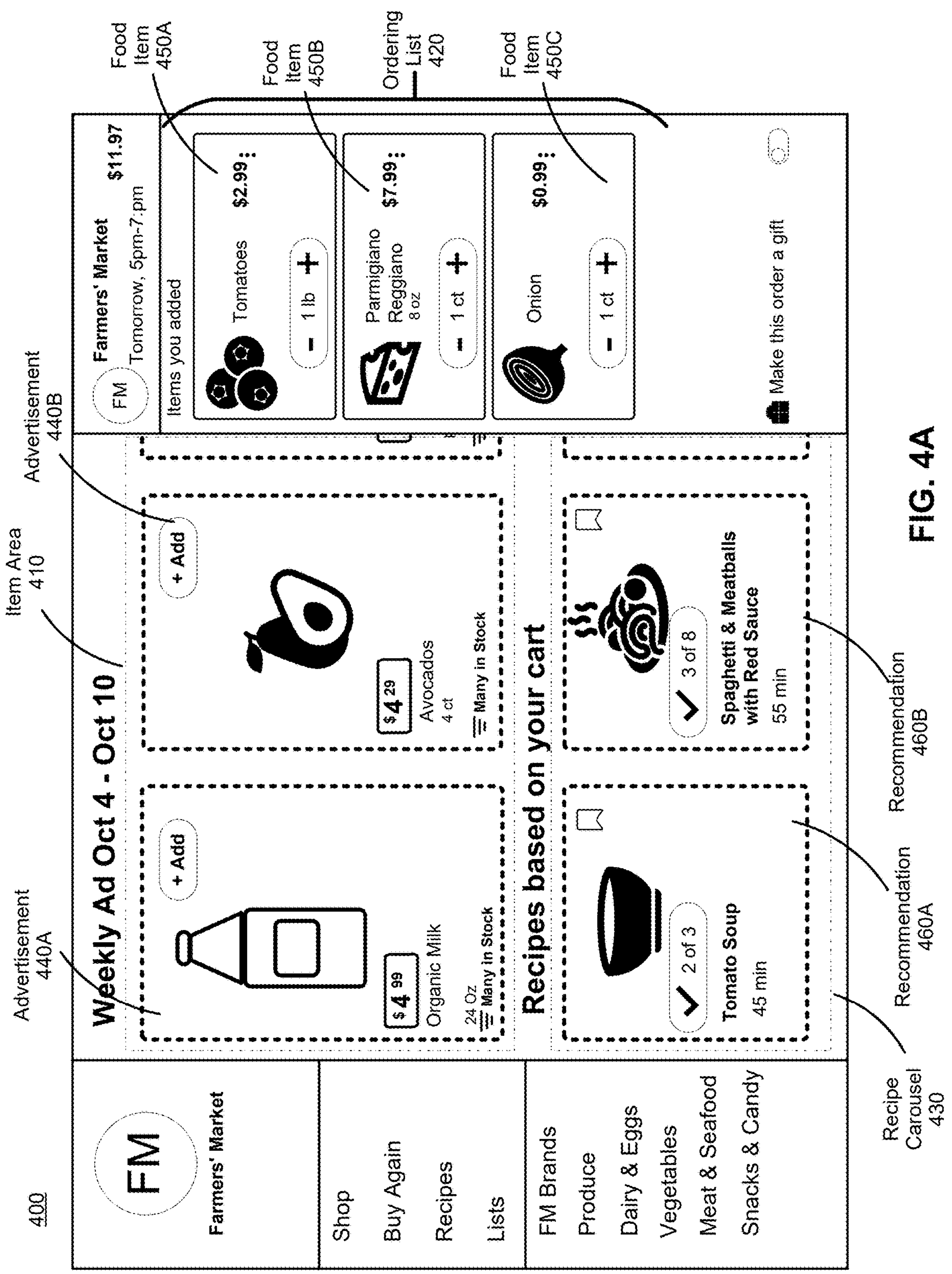
FIG. 4A illustrates an example ordering interface associated with a storefront, in accordance with some embodiments.

FIG. 4A illustrates an example ordering interface 400 associated with a storefront, in accordance with some embodiments. The ordering interface 400 is an embodiment of the ordering interface 400 described above with regard to FIG. 1. The ordering interface 400 may be presented on a user client device (e.g., the user client device 100). The ordering interface 400 is a user interface that presents items (e.g., food items, and in some cases, non-food items) that are available to purchase from the storefront. The storefront is a portal used by a source (e.g., associated with the source computing system 120) to sell one or more items. For example, the source in FIG. 4A is "Farmers' Market." In the illustrated embodiment, the ordering interface 400 includes at least an item area 410, an ordering list 420, and a recipe carousel 430. In other embodiments, the ordering interface 400 includes different or additional elements. In addition, the functions may be distributed among the elements in a different manner than described.

The item area 410 presents information describing various items that are for sale. For example, as shown the item area 410 presents an advertisement 440A for a food item (e.g., Organic Milk) and an advertisement 440B for another food item (e.g., avocados). The advertisements may be scrolled through allowing a user to view the various food items for sale, add available food items to the ordering list 420, etc. For example, in the example shown in FIG. 4A, there are three food items that have been added to the ordering list, specifically, a food item 450A (e.g., 1 lb of tomatoes), a food item 450B (8 oz of Parmigiana Reggiano cheese), and a food item 450C (an onion).

As described above with regard to, e.g., FIGS. 1-3, the online system 140 provides one or more recommendations for one or more linked recipes to the user client device 100 for presentation based in part on the content (i.e., the food items 450A, 450B, 450C) of the ordering list 420 being key ingredients for the one or more linked recipes. In the illustrated embodiment, the ordering interface 400 presents the one or more recommendations of linked recipes using the recipe carousel 430. For example, as shown, the recipe carousel 430 presents a recommendation 460A for tomato soup, and a recommendation 460B for spaghetti and meatballs with red sauce. The one or more recommendations for linked recipes may be scrolled through allowing a user to view the various recommendations in the recipe carousel 430. The one or more recommendations for linked recipes are presented in ranked order. In the illustrated embodiments, the recommendation 460A has the highest rank, followed by the recommendation 460B, and so on and so forth. In some embodiments, each of the displayed recommendations includes an indication of how many key ingredients (for a given linked recipe) are currently present in the ordering list 420. For example, the recommendation 460A is for tomato soup, and the linked recipe has three key ingredients, tomatoes, onions, and vegetable stock. And as two of the key ingredients (i.e., tomatoes and an onion) of the recipe are in the ordering list, the recipe shows that "2 of 3" key ingredients are present. The displayed recipes may be bookmarkable.

Moreover, responsive to a selection of a particular recommendation for a linked recipe, the ordering interface 400 may update to show further details about the selected linked recipe.

Figure 4B:
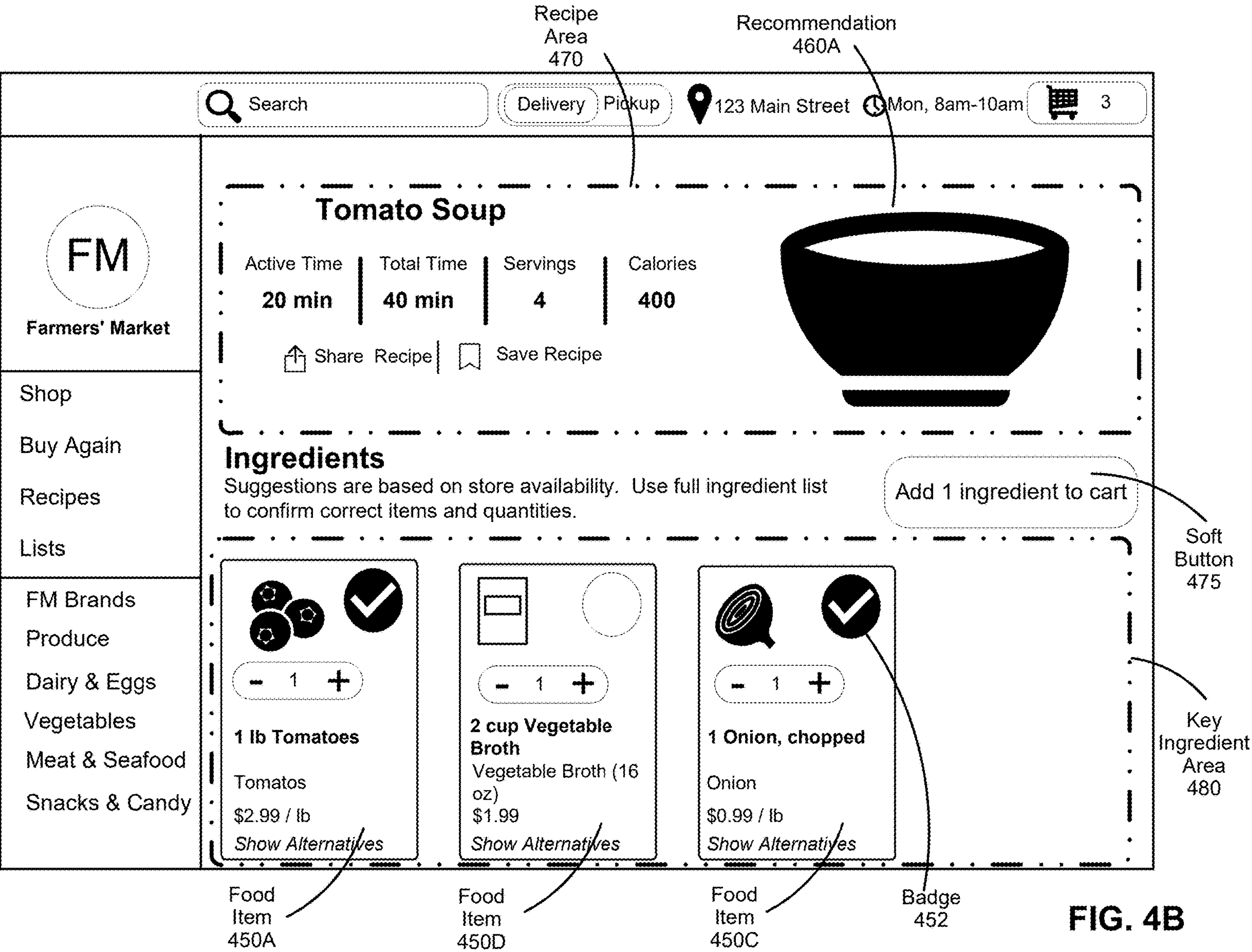
FIG. 4B illustrates the ordering interface of FIG. 4A after selection of a recommendation for a linked recipe, in accordance with some embodiments.

FIG. 4B illustrates the ordering interface 400 of FIG. 4A after selection of the recommendation 460A, in accordance with some embodiments. In some embodiments, once a recommendation for a linked recipe has been selected, the ordering interface 400 is updated to prominently present information associated with the linked recipe in a recipe area 470 and key ingredients for the linked recipe in a key ingredient area 480.

The recipe area 470 presents information describing the linked recipe. The information may include, e.g., a name of the linked recipe, a listing of ingredients for the linked recipe, instructions on how to use ingredients in the list of ingredients to prepare the meal, an active time for the recipe, a total preparation time (also referred to as total time), number of servings that the recipe produces, calories associated with the lined recipe, user reviews of the recipe, pictures of ingredient preparation at one or more steps in the recipe, some other information relevant to the recipe, or some combination thereof. For example, in FIG. 4B the recipe area 470 presents information associated with the selected recommendation (i.e., the recommendation 460A) for tomato soup.

The key ingredient area 480 presents all of the items that are key ingredients associated with the recipe presented in the recipe area 470. Note that the ordering list may include items (e.g., the food item 450B) that are not key ingredients for the selected recipe and hence are not presented in the key ingredient area 480 for that recipe. The presented food items may also include an amount of the food item suggested for the linked recipe. For example, in the illustrated embodiment, the key ingredient area 480 presents the food item 450A, the food item 450C, and a food item 450D, all of which are key ingredients to the recommendation 460A. For food items in the key ingredient area 480, each food item is presented with an indication of whether or not the food item is already present in the ordering list. For example, a food item in the key ingredient area 480 that is already present in the ordering list may include a badge (e.g., badge 452), and food items (e.g., the food item 450D) that are not currently in the ordering list would be missing the badge. The badge may be, e.g., a large check mark. In other embodiments, some other type of badge or means of notification may be used as an indication that a food item is already present in the ordering list.

In some embodiments, the ordering interface 400 may also include a soft button 475 to add any food items in the key ingredient area 480 that are not already in the ordering list to the ordering list with a single selection. The soft button 475 may also include text specifying the number of ingredients that would be added to the ordering list upon selection of soft button 475. For example, as shown only the food item 450D is not already part of the ordering list, accordingly, the displayed text is "Add 1 ingredient to cart." Note, in some embodiments, the ordering interface 400 may also present a price associated with selection of the soft button 475.

Figure 5:
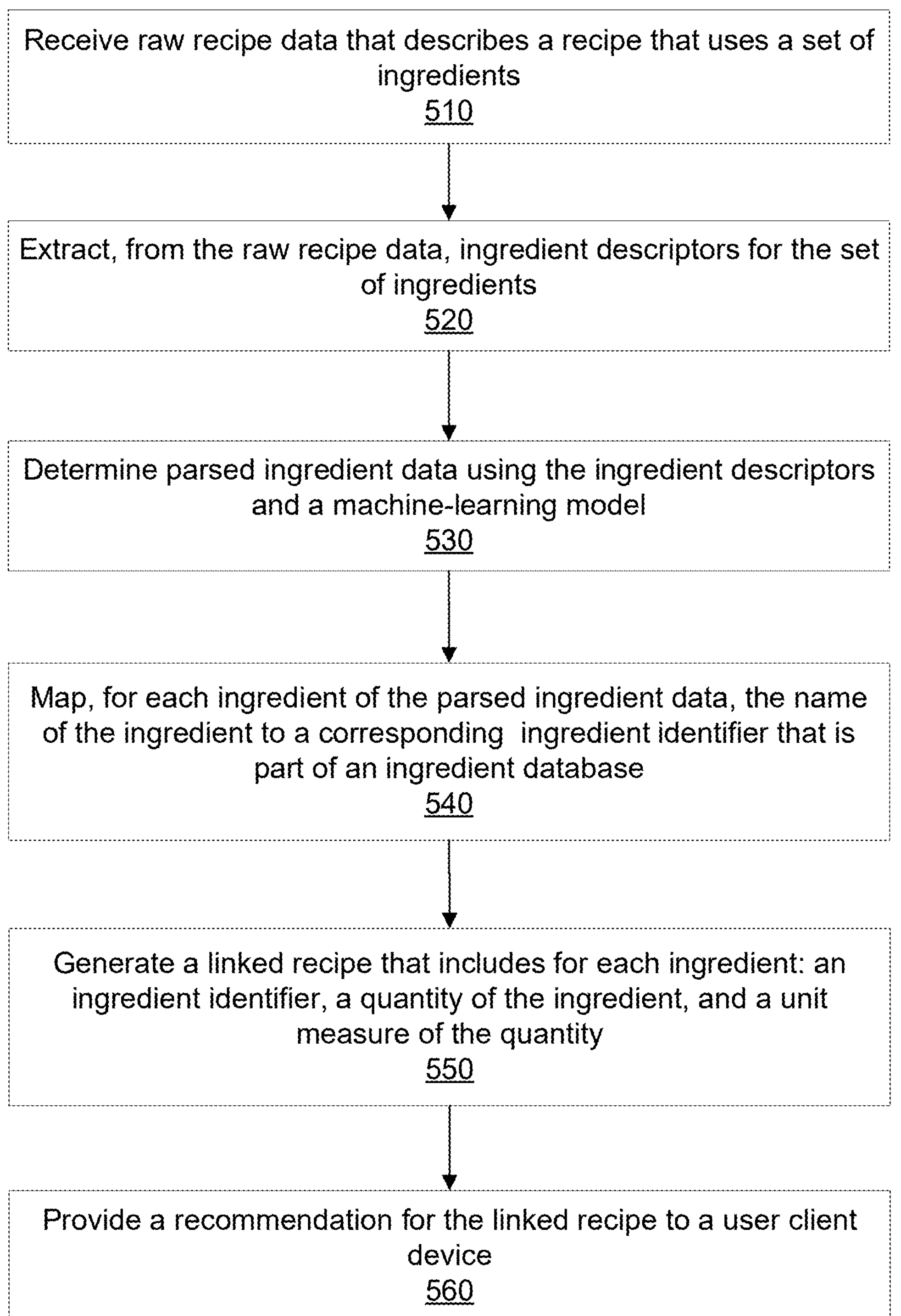
FIG. 5 is a flowchart for a method of item linked recipe generation using machine learning, in accordance with some embodiments.

FIG. 5 is a flowchart for a method of item linked recipe generation using machine learning, in accordance with some embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system receives 510 raw recipe data that describes a recipe that uses a set of ingredients. For example, the online system may receive recipes from, e.g., the user client device 100, the source computing system 120, a third party website, an agent of the online system 140, or some combination thereof.

The online system extracts 520, from the raw recipe data, ingredient descriptors for the set of ingredients. The online system may, e.g., generate one or more prompts to provide to a machine-learning model (e.g., of the AI system 125 or the online system 140). The one or more prompts may instruct the machine-learning model to extract ingredient descriptors for a set of ingredients used by a recipe described by the raw recipe data. In some embodiments, the one or more prompts may instruct the machine-learning model to identify whether any ingredients are compound ingredients that are composed of multiple ingredients, separate any identified compound ingredient into separate ingredients such that the set of ingredients includes the multiple ingredients, and extract, from the raw recipe data, ingredient descriptors for the set of ingredients. In some embodiments, the one or more prompts may instruct the machine-learning model to identify whether the recipe includes a sub-recipe, and to identify any ingredients that are associated with the sub-recipe such that the set of ingredients includes ingredients for the recipe and ingredients for the sub-recipe, and extract, from the raw recipe data, ingredient descriptors for the set of ingredients.

The online system determines 530 parsed ingredient data using the ingredient descriptors and a machine-learning model. The parsed ingredient data for each ingredient of the set of ingredients includes a name of the ingredient, a quantity of the ingredient, and a unit of measure of the quantity. The online system may generate one or more prompts to determine parsed ingredient data to provide to a machine-learning model (e.g., of the AI system 125 or the online system 140). The one or more prompts instruct the machine-learning model to determine, from the ingredient descriptors, ingredient descriptors for each of the plurality of recipes. The one or more prompts may be applied to the machine-learning model to determine the parsed ingredient data for each of the plurality of recipes.

Note that in some instances the machine learning model has been trained to handle ingredient descriptors that do not include, e.g., a quantifiable ingredient amount or ingredient type. In other embodiments, the online system may generate prompts to handle these types of situations. For example, in some embodiments, a generated prompt may, e.g., instruct the machine-learning model to select, for an ingredient that has a range of quantities, a highest value of the range of quantities. In some embodiments, a generated prompt may, e.g., instruct the machine-learning model to select, for an ingredient descriptor that does not specify a quantity, a quantity of one or a unit value of "each."

The online system maps 540, for each ingredient of the parsed ingredient data, the name of the ingredient to a corresponding ingredient identifier that is part of an ingredient database (e.g., the ingredient database 242). The ingredient database includes one or more versions (e.g., synonyms, acronyms, etc.) of ingredient names for each ingredient tracked in the ingredient database. The one or more ingredient names, for a single ingredient, may be mapped to a single ingredient identifier for that single ingredient, where the ingredient identifier is associated with one or more corresponding items that are available for sale (e.g., via an online catalog of the online system) at one or more sources. In this manner, each ingredient name of the parsed ingredient data is mapped to a corresponding item that is available for purchase at one or more sources.

The online system generates 550 a linked recipe that includes for each ingredient: an ingredient identifier, a quantity of the ingredient, and a unit of measure of the quantity. The online system may form a linked recipe from ingredient identifiers associated with the recipe, parsed ingredient data associated with the recipe, and steps of the recipe. Each ingredient of a linked recipe includes a corresponding ingredient identifier which may map to corresponding items that are available for sale via the online catalog at one or more sources.

The online system may determine key ingredients of the recipe. For example, the online system may generate a prompt to instruct a machine-learning model to identify at least one key ingredient of the recipe. The prompt is applied to a machine learning model (e.g., of the AI system 125 or the online system 140) along with some or all of the raw recipe data, the ingredient descriptors, and the parsed ingredient data, to obtain key ingredients for the recipe. The online system may map the one or more linked recipes to their identified one or more key ingredients in a recipe database (e.g., the recipe database 245). The online system may update the recipe database with new mappings of key ingredients to the linked recipe.

The online system provides 560 a recommendation for the linked recipe to a user client device. The online system may, e.g., query the recipe database based in part on food items in an ordering list (e.g., associated with the user client device) to obtain one or more linked recipes that use at least some of the food items as key ingredients. For example, the online system may identify all food items in the ordering list, and generate the query based on the identified food items. The online system may rank the one or more linked recipes obtained from the recipe database based on one or more ranking criteria. The online system may then provide recommendations for the one or more ranked linked recipes to the user client device.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving first raw recipe data that describes a recipe that uses a set of ingredients;

extracting, from the first raw recipe data, ingredient descriptors for the set of ingredients, wherein an ingredient descriptor of the ingredient descriptors comprises a range of quantities associated with an ingredient of the set of ingredients;

generating, by a recipe management module of an online system, parsed ingredient data by prompting a large language model of an artificial intelligence system using the ingredient descriptors, such that the parsed ingredient data for each ingredient of the set of ingredients includes an ingredient name, an ingredient quantity, and a unit of measure of the ingredient quantity, wherein generating the parsed ingredient data by prompting the large language model comprises:

generating, by a first neural network model of the artificial intelligence system, a prompt to provide to the large language model, wherein the prompt instructs the large language model to select a value from the range of quantities, wherein the parsed ingredient data for the ingredient descriptor specifies a single quantity of the ingredient, and the single quantity corresponds to the value of the range of quantities;

mapping, for each ingredient of the parsed ingredient data, the ingredient name to a corresponding ingredient identifier that is part of an ingredient database, and each ingredient identifier in the ingredient database is associated with a corresponding item that is available for sale at one or more sources;

generating a first linked recipe associated with the first raw recipe data;

generating a second linked recipe associated with second raw recipe data;

in response to accessing, by a user client device, a graphical user interface (GUI) associated with the online system:

providing, by a second neural network model of the artificial intelligence system, a search query prompt to the large language model, wherein the search query prompt requests an order for presenting the first linked recipe and the second linked recipe in different positions of a scrollable recipe carousel to be displayed on the GUI;

computing, by the large language model, (i) a first embedding score associated with a first item embedding and a third item embedding and (ii) a second embedding score associated with a second item embedding and the third item embedding;

selecting, by the large language model, the order of the first linked recipe and the second linked recipe for presentation based on the first embedding score and the second embedding score; and causing the user client device to display the GUI by rendering the first linked recipe and second linked recipe in respective positions of the scrollable recipe carousel, the respective positions corresponding to the selected order.

2. The method of claim 1, further comprising:

tuning the large language model using one or more examples, each example including raw recipe data and a corresponding set of parsed ingredient data.

3. The method of claim 1, further comprising:

generating additional training examples using portions of the linked recipe and complaint data; and tuning the large language model based in part on the additional training examples.

4. The method of claim 1, further comprising:

identifying, using the ingredient identifier of the linked recipe, a corresponding item that is available for sale from a source of the one or more sources that is associated with the user client device; and providing a description for the corresponding item to the user client device.

5. The method of claim 1, wherein a first ingredient descriptor of the recipe does not specify a quantity, and generating parsed ingredient data by prompting a large language model using the ingredient descriptors comprises:

generating, by the first neural network model, a prompt to provide to the large language model, the prompt instructing the large language model to select, for an ingredient descriptor that does not specify a quantity, a quantity of one, wherein the parsed ingredient data for the first ingredient descriptor specifies a quantity of one for the first ingredient descriptor.

6. The method of claim 1, wherein mapping, for each ingredient of the parsed ingredient data, the name of the ingredient to a corresponding ingredient identifier that is part of the ingredient database, further comprises:

for a name of a first ingredient of the set of ingredients, mapping the name of the first ingredient to a corresponding set of one or more versions of the name of the first ingredient that are mapped to a first ingredient identifier in the ingredient database, and mapping the name of the first ingredient to the first ingredient identifier.

7. The method of claim 6, wherein the corresponding set of one or more versions of the name of the first ingredient are synonyms for the name of the first ingredient.

8. The method of claim 1, wherein a first ingredient of the recipe is a compound ingredient that is composed of a separate first ingredient and a second separate ingredient, and extracting, from the raw recipe data, ingredient descriptors for the set of ingredients, further comprises:

generating a prompt to provide to the large language model, the prompt instructing the large language model to:

identify whether any ingredient of the set of ingredients is a compound ingredient that is composed of multiple ingredients, separate any identified compound ingredient into separate ingredients such that the set of ingredients includes the multiple ingredients, and extract, from the raw recipe data, ingredient descriptors for the set of ingredients, wherein the ingredient descriptors include an ingredient descriptor for the first separate ingredient and an ingredient descriptor for the second separate ingredient.

9. The method of claim 1, wherein the recipe includes a sub-recipe that is composed of a first ingredient and a second ingredient, and extracting, from the raw recipe data, ingredient descriptors for the set of ingredients, further comprises:

generating, by the first neural network model, a prompt to provide to the large language model, the prompt instructing the large language model to:

identify whether the recipe includes a sub-recipe, identify any ingredients that are associated with the sub-recipe, such that the set of ingredients includes ingredients for the recipe and ingredients for the sub-recipe, and extract, from the raw recipe data, ingredient descriptors for the set of ingredients, wherein the ingredient descriptors includes an ingredient descriptor for the first ingredient and an ingredient descriptor for the second ingredient.

10. A computer program product comprising a non-transitory computer readable storage medium having instructions encoded thereon that, when executed by a processor of a computer system, cause the computer system to perform steps comprising:

receiving first raw recipe data that describes a recipe that uses a set of ingredients;

extracting, from the first raw recipe data, ingredient descriptors for the set of ingredients, wherein an ingredient descriptor of the ingredient descriptors comprises a range of quantities associated with an ingredient of the set of ingredients;

generating, by a recipe management module of an online system, parsed ingredient data by prompting a large language model of an artificial intelligence system using the ingredient descriptors, such that the parsed ingredient data for each ingredient of the set of ingredients includes an ingredient name, an ingredient quantity, and a unit of measure of the ingredient quantity, wherein generating the parsed ingredient data by prompting the large language model comprises:

generating, by a first neural network model of the artificial intelligence system, a prompt to provide to the large language model, wherein the prompt instructs the large language model to select a value from the range of quantities, wherein the parsed ingredient data for the ingredient descriptor specifies a single quantity of the ingredient, and the single quantity corresponds to the value of the range of quantities;

mapping, for each ingredient of the parsed ingredient data, the ingredient name to a corresponding ingredient identifier that is part of an ingredient database, and each ingredient identifier in the ingredient database is associated with a corresponding item that is available for sale at one or more sources;

generating a first linked recipe associated with the first raw recipe data;

generating a second linked recipe associated with second raw recipe data;

in response to accessing, by a user client device, a graphical user interface (GUI) associated with the online system:

providing, by a second neural network model of the artificial intelligence system, a search query prompt to the large language model, wherein the search query prompt requests an order for presenting the first linked recipe and the second linked recipe in different positions of a scrollable recipe carousel to be displayed on the GUI;

computing, by the large language model, (i) a first embedding score associated with a first item embedding and a third item embedding and (ii) a second embedding score associated with a second item embedding and the third item embedding;

selecting, by the large language model, the order of the first linked recipe and the second linked recipe for presentation based on the first embedding score and the second embedding score; and causing the user client device to display the GUI by rendering the first linked recipe and second linked recipe in respective positions of the scrollable recipe carousel, the respective positions corresponding to the selected order.

11. The computer program product of claim 10, further comprising encoded instructions that when executed cause the computer system to perform steps comprising:

tuning the large language model using one or more examples, each example including raw recipe data and a corresponding set of parsed ingredient data.

12. The computer program product of claim 10, further comprising encoded instructions that when executed cause the computer system to perform steps comprising:

generating additional training examples using portions of the linked recipe and complaint data; and tuning the large language model based in part on the additional training examples.

13. The computer program product of claim 10, wherein a first ingredient descriptor of the recipe does not specify a quantity, and generating parsed ingredient data by prompting a large language model using the ingredient descriptors comprises:

generating, by the first neural network model, a prompt to provide to the large language model, the prompt instructing the large language model to select, for an ingredient descriptor that does not specify a quantity, a quantity of one, wherein the parsed ingredient data for the first ingredient descriptor specifies a quantity of one for the first ingredient descriptor.

14. The computer program product of claim 10, wherein the encoded instructions to map, for each ingredient of the parsed ingredient data, the name of the ingredient to a corresponding ingredient identifier that is part of the ingredient database, further comprises instructions that when executed cause the computer system to perform steps comprising:

for a name of a first ingredient of the set of ingredients, mapping the name of the first ingredient to a corresponding set of one or more versions of the name of the first ingredient that are mapped to a first ingredient identifier in the ingredient database, and mapping the name of the first ingredient to the first ingredient identifier.

15. The computer program product of claim 14, wherein the corresponding set of one or more versions of the name of the first ingredient are synonyms for the name of the first ingredient.

16. The computer program product of claim 10, wherein a first ingredient of the recipe is a compound ingredient that is composed of a first separate ingredient and a second separate ingredient, and the encoded instructions to extract, from the raw recipe data, ingredient descriptors for the set of ingredients, further comprises instructions that when executed cause the computer system to perform steps comprising:

generating a prompt to provide to the large language model, the prompt instructing the large language model to:

identify whether any ingredient of the set of ingredients is a compound ingredient that is composed of multiple ingredients, separate any identified compound ingredient into separate ingredients such that the set of ingredients includes the multiple ingredients, and extract, from the raw recipe data, ingredient descriptors for the set of ingredients, wherein the ingredient descriptors include an ingredient descriptor for the first separate ingredient and an ingredient descriptor for the second separate ingredient.

17. The computer program product of claim 10, wherein the recipe includes a sub-recipe that is composed of a first ingredient and a second ingredient, and the encoded instructions to extract, from the raw recipe data, ingredient descriptors for the set of ingredients, further comprises instructions that when executed cause the computer system to perform steps comprising:

generating a prompt to provide to the large language model, the prompt instructing the large language model to:

identify whether the recipe includes a sub-recipe, identify any ingredients that are associated with the sub-recipe, such that the set of ingredients includes ingredients for the recipe and ingredients for the sub-recipe, and extract, from the raw recipe data, ingredient descriptors for the set of ingredients, wherein the ingredient descriptors include an ingredient descriptor for the first ingredient and an ingredient descriptor for the second ingredient.

18. A computer system comprising:

a processor; and a non-transitory computer readable storage medium having instructions encoded thereon that, when executed by the processor, cause the computer system to perform steps comprising:

receiving first raw recipe data that describes a recipe that uses a set of ingredients;

extracting, from the first raw recipe data, ingredient descriptors for the set of ingredients, wherein an ingredient descriptor of the ingredient descriptors comprises a range of quantities associated with an ingredient of the set of ingredients;

generating, by a recipe management module of an online system, parsed ingredient data by prompting a large language model of an artificial intelligence system using the ingredient descriptors, such that the parsed ingredient data for each ingredient of the set of ingredients includes an ingredient name, an ingredient quantity, and a unit of measure of the ingredient quantity, wherein generating the parsed ingredient data by prompting the large language model comprises:

generating, by a first neural network model of the artificial intelligence system, a prompt to provide to the large language model, wherein the prompt instructs the large language model to select a value from the range of quantities, wherein the parsed ingredient data for the ingredient descriptor specifies a single quantity of the ingredient, and the single quantity corresponds to the value of the range of quantities;

mapping, for each ingredient of the parsed ingredient data, the ingredient name to a corresponding ingredient identifier that is part of an ingredient database, and each ingredient identifier in the ingredient database is associated with a corresponding item that is available for sale at one or more sources;

generating a first linked recipe associated with the first raw recipe data;

generating a second linked recipe associated with second raw recipe data;

in response to accessing, by a user client device, a graphical user interface (GUI) associated with the online system:

providing, by a second neural network model of the artificial intelligence system, a search query prompt to the large language model, wherein the search query prompt requests an order for presenting the first linked recipe and the second linked recipe in different positions of a scrollable recipe carousel to be displayed on the GUI;

computing, by the large language model, (i) a first embedding score associated with a first item embedding and a third item embedding and (ii) a second embedding score associated with a second item embedding and the third item embedding;

selecting, by the large language model, the order of the first linked recipe and the second linked recipe for presentation based on the first embedding score and the second embedding score; and causing the user client device to display the GUI by rendering the first linked recipe and second linked recipe in respective positions of the scrollable recipe carousel, the respective positions corresponding to the selected order.

* * * * *